United States Patent
Choi et al.

(10) Patent No.: US 8,947,779 B2
(45) Date of Patent: Feb. 3, 2015

(54) APPARATUS FOR DISPLAYING A MULTI-VIEW 3D IMAGE

(75) Inventors: Kyu-hwan Choi, Yongin-si (KR); Yoon-sun Choi, Yongin-si (KR); Hong-seok Lee, Seongnam-si (KR); Hoon Song, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 316 days.

(21) Appl. No.: 13/045,703

(22) Filed: Mar. 11, 2011

(65) Prior Publication Data

US 2012/0019908 A1  Jan. 26, 2012

(30) Foreign Application Priority Data

Jul. 22, 2010 (KR) .......................... 10-2010-0071064

(51) Int. Cl.
*G02B 27/22* (2006.01)
*H04N 13/04* (2006.01)

(52) U.S. Cl.
CPC ........ *G02B 27/2214* (2013.01); *H04N 13/0413* (2013.01); *H04N 13/0409* (2013.01); *G02B 27/2242* (2013.01); *H04N 13/0411* (2013.01); *G02B 27/2264* (2013.01)
USPC .................. 359/464; 359/462; 348/55; 345/7

(58) Field of Classification Search
CPC .......... H04N 13/0409; H04N 13/0411; H04N 13/0413; G02B 27/2242; G02B 27/2264; G02B 27/2214
USPC ......... 359/462, 463, 464, 228; 353/7; 348/55; 345/7
See application file for complete search history.

(56) References Cited

U.S. PATENT DOCUMENTS

| | | | |
|---|---|---|---|
| 6,710,920 B1 * | 3/2004 | Mashitani et al. ............ 359/463 |
| 7,515,340 B1 | 4/2009 | Shiu et al. |
| 7,609,229 B2 * | 10/2009 | Urakawa ............................ 345/7 |
| 7,688,509 B2 * | 3/2010 | Vissenberg et al. ........... 359/463 |
| 2003/0197933 A1 * | 10/2003 | Sudo et al. ..................... 359/464 |
| 2007/0019067 A1 * | 1/2007 | Tsubaki et al. ................. 348/55 |
| 2008/0198292 A1 | 8/2008 | Marra et al. |
| 2008/0316302 A1 | 12/2008 | Vos et al. |

(Continued)

FOREIGN PATENT DOCUMENTS

| | | |
|---|---|---|
| JP | 2006-113182 | 4/2006 |
| JP | 2008-219618 | 9/2008 |
| KR | 10-2005-0012513 | 2/2005 |

(Continued)

OTHER PUBLICATIONS

International Search Report mailed Mar. 8, 2009 for WO 2009/050273.

*Primary Examiner* — Audrey Y Chang
(74) *Attorney, Agent, or Firm* — NSIP Law (57) ABSTRACT

An apparatus for displaying a 3-dimensional (3D) image, which is capable of providing a super multi-view, is provided. The apparatus includes: at least one image projector for projecting light including an image; an active optical element for adjusting a path of at least one light within a range of a predetermined angle; and a relay optical system for transmitting the at least one light to a pupil of a viewer. The apparatus provides a plurality of images in different views to the pupil using a time division method, by using the active optical element for adjusting the path of the at least one light.

20 Claims, 10 Drawing Sheets

(56) References Cited

U.S. PATENT DOCUMENTS

2009/0079762 A1  3/2009  Fukushima et al.
2010/0296148 A1* 11/2010  Reichelt et al. ............... 359/228

FOREIGN PATENT DOCUMENTS

| KR | 10-2010-0019447 | 2/2010 |
| WO | WO 2009/050273 | 4/2009 |

* cited by examiner

FIG. 10C

APPARATUS FOR DISPLAYING A MULTI-VIEW 3D IMAGE

CROSS-REFERENCE TO RELATED APPLICATION(S)

This application claims the benefit under 35 U.S.C. §119(a) of Korean Patent Application No. 10-2010-0071064, filed on Jul. 22, 2010, in the Korean Intellectual Property Office, the entire disclosure of which is incorporated herein by reference for all purposes.

BACKGROUND

1. Field

The following description relates to apparatuses for displaying a multi-view three-dimensional (3D) image, and more particularly, to an apparatus for displaying a super multi-view 3D image with a simple structure using an active optical element that is capable of changing a path of light.

2. Description of the Related Art

Recently, the amount of apparatuses for displaying a three-dimensional (3D) image has increased. For example, 3D image displays are included in games, commercials, medical images, education, military, and the like. Also, as high-definition televisions (TVs) are becoming more popular, 3D TVs for watching television in 3D are gradually being commercialized. Accordingly, various technologies for realizing a 3D image have been suggested. Most commercialized apparatuses for displaying a 3D image use binocular parallax. For example, a left-eye image and a right-eye image that have different views are respectively provided to a left-eye and a right-eye of a viewer so that the viewer feels a 3D effect. Examples of such apparatuses include an apparatus for displaying a 3D image that requires special glasses, and an apparatus for displaying a 3D image that does not require glasses.

However, in a conventional apparatus for displaying a 3D image, which only provides two views of a left-eye image and a right-eye image, when a viewer moves, a change of views occurs. However, this change of view because of the movement of the viewer is not reflected, and thus, the ability to provide a natural 3D effect may be limited.

In order to provide natural motion parallax, an apparatus for displaying a multi-view 3D image, which is capable of providing a plurality of views, is suggested. Such an apparatus provides 3D images in different views to a plurality of viewing zones. However, in a conventional apparatus for displaying a multi-view 3D image, a non-3D view area or a reverse 3D view area may be generated between viewing zones because of crosstalk that is generated between different viewing zones. Also, the number of views may be high in order to provide natural motion parallax, but this may cause a decrease in resolution of a unit view. For example, in an apparatus for displaying a 3D image using a projection optical system, the number of projection optical systems is increased in order to increase the number of views. In this example, a volume of the entire system may be increased. Moreover, because the conventional apparatus for displaying a multi-view 3D image typically provides only binocular parallax, a 3D image is not viewed by at least one eye.

SUMMARY

In one general aspect, there is provided an apparatus for displaying a three-dimensional (3D) image, the apparatus includes: at least one image projector for projecting light including an image; an active optical element for adjusting a path of at least one light projected from the at least one image projector by refracting each of the at least one light; and a relay optical system for transmitting the at least one refracted light to a pupil of a viewer, wherein a plurality of images in different views are provided to the pupil in a time division method.

The active optical element may be configured to refract each of the at least one light at different angles.

The active optical element may be an electro-wetting prism having a slope of a refractive surface that changes according to an electrical control.

One active optical element may be disposed for each of the at least one image projectors.

The at least one image projector may project lights including images in different views.

The at least one image projector may be configured to sequentially project images in different views according to chronological order, and the active optical element may be configured to refract lights including the plurality of images in different views at different angles by synchronizing with a light projecting time of the at least one image projector.

The relay optical system may include: a first lens for focusing the at least one light refracted by the active optical element; a barrier including a plurality of pin holes; and a second lens for transmitting the at least one light to the pupil of the viewer.

A distance between at least one of the active optical element and the first lens, a distance between the first lens and the barrier, a distance between the barrier and the second lens, and a distance between the first lens and the second lens may be adjusted in such a way that the light projected from the at least one image projected is incident within a size of the pupil.

In another aspect, there is provided an apparatus for displaying a three-dimensional (3D) image, the apparatus includes: a display panel including an array of a plurality of pixels and generating a light including an image; an active optical element for adjusting a path of the light incident from the display panel by refracting the light; and a relay optical system for transmitting the light refracted by the active optical element to a pupil of a viewer, wherein a plurality of images in different views are provided to the pupil in a time division method.

The apparatus may further include a backlight unit for providing parallel light to the display panel, wherein the display panel is a non-emissive display panel.

The active optical element may be configured to refract the light at a plurality of different angles.

The active optical element may be an electro-wetting prism having a slope of a refractive surface that changes according to an electrical control.

A plurality of the active optical elements may be disposed in an array in a one to one correspondence with the plurality of pixels of the display panel or in correspondence with pixels in one column of the display panel.

The display panel may be configured in such a way that at least two adjacent pixels display images in different views.

The display panel may be configured to sequentially display the plurality of images in different views according to chronological order, and the active optical element may be configured to refract light including the image in different views at different angles by synchronizing with a time of the display panel displaying an image of a certain view.

The relay optical system may include: a first lens for focusing the light refracted by the active optical element; a barrier including a plurality of pin holes; and a second lens for transmitting the refracted light to the pupil of the viewer.

The first and second lenses may be each formed of a lens array sheet having an array of minute unit lenses.

Each of the minute unit lenses may be a plano-convex cylinder lens.

A convex surface of each of the minute unit lenses of the first lens may be disposed facing the display panel, and a convex surface of each of the minute unit lenses of the second lens may be disposed facing the viewer.

A width of each of the minute unit lenses may be configured to correspond to a width of at least one pixel array.

In another aspect, there is provided an apparatus for displaying a 3-dimensional (3D) image, the apparatus includes: a display panel including an array of pixels; a backlight unit disposed on a rear surface of the display panel, and providing a parallel light to the display panel; an active optical element disposed between the backlight unit and the display panel, and providing a light incident from the backlight unit after changing a path of the light by refracting the light; and a relay optical system disposed on a front surface of the display panel and transmitting the light passed through the display panel to a pupil of a viewer, wherein a plurality of images in different views are provided to the pupil in a time division method.

A three-dimensional (3D) image display apparatus, comprising: an active optical element configured to adjust the path of at least two light beams projected from an image projector by refracting the at least two light beams; and a relay optical system configured to generate a 3D image by transmitting the refracted at least two light beams towards a pupil of a viewer such that at least two different images based on the at least two light beams are simultaneously provided to the pupil of the viewer.

The relay optical system may be further configured to generate a 3D image by transmitting at least two different images towards different respective edges of the pupil of the viewer and such that the at least two images are simultaneously incident within the pupil of the viewer.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

As described herein, the term "light" may refer to one or more of a light beam, a ray of light, a light wave, and the like.

Figure 1:
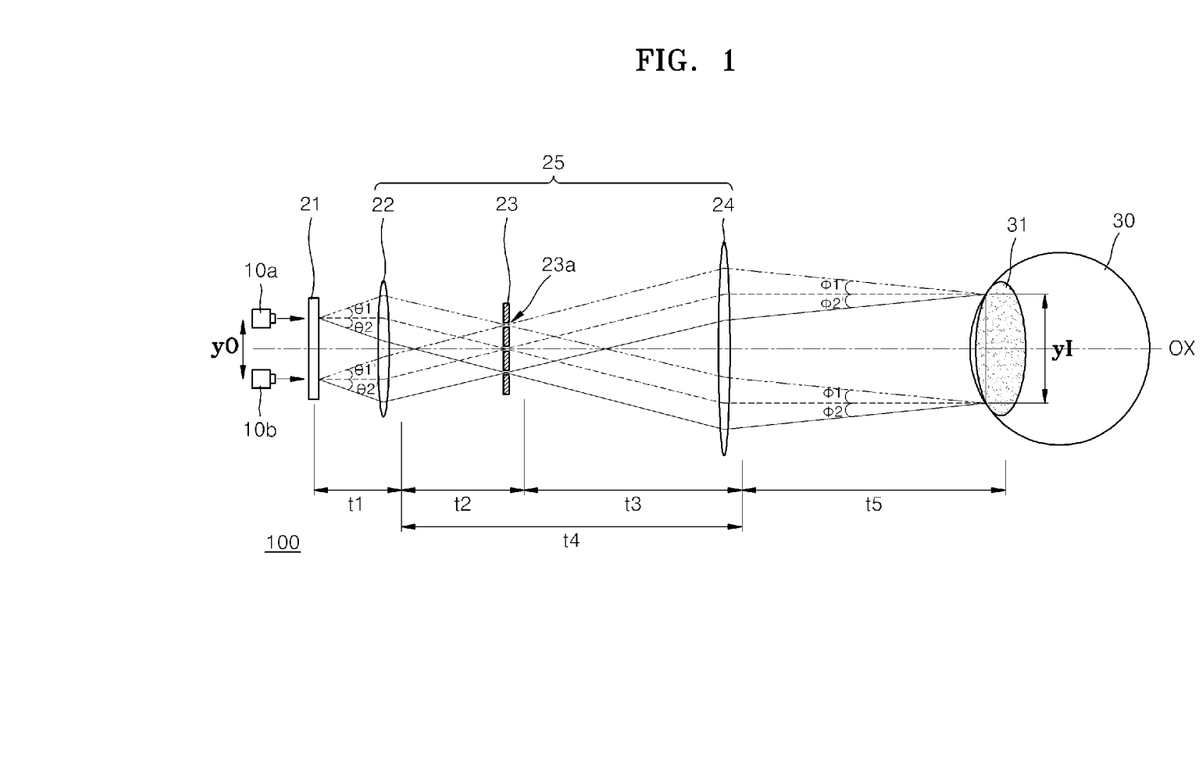
FIG. 1 is a diagram illustrating an example of an apparatus for displaying a super multi-view three-dimensional (3D) image.

FIG. 1 illustrates an example of an apparatus for displaying a super multi-view three-dimensional (3D) image.

Referring to FIG. 1, apparatus 100 includes first and second image projectors 10a and 10b for projecting light including an image, an active optical element 21 for adjusting a path of the light within a predetermined angle range, and a relay optical system 25 for transmitting the light to a pupil 31 of an eyeball 30 of a viewer. The relay optical system 25 may include, for example, a first lens 22 for focusing light refracted by the active optical element 21, a barrier 23 including a plurality of pin holes 23a, and a second lens 24 for transmitting an image to the pupil 31. The pin holes 23 may remove unnecessary light spillage components between the first lens 22 and the second lens 24 such that only desired light components are incident on the pupil 31. In the example of FIG. 1, the apparatus 100 includes two image projectors 10a and 10b that are apart from each other by a distance yO, however, the number of image projectors is not limited thereto. For example, three or more image projectors may be used or only one image projector may be used. It should also be appreciated that the distance between the various image projectors is not limited to yO.

In this example, lights containing image information are projected from the first and second image projectors 10a and 10b, refracted at the active optical element 21 by a predetermined angle, and then incident on the relay optical system 25. The lights refracted by the active optical element 21 are directed incident on the pupil 31 by the relay optical system 25. For example, the lights may be focused by the first lens 22 and incident on the second lens 24 across an optical axis OX. The lights may pass through the pin holes 23a that remove a noise component, for example, an external light, a scattered light, or a reflected light. Also, the pin holes 23a may pass only the light that is directed along a certain path such that light is accurately incident on the pupil 31. Then, the light may be refracted toward the pupil 31 by the second lens 24. For example, the light projected from the first image projector 10a may be incident on a left edge of the pupil 31, and the light projected from the second image projector 10b may be incident on a right edge of the pupil 31.

However, a size yl of the pupil 31 of the viewer generally differs, for example, based on ambient light available and a respective viewer's ability to see. Accordingly, an arrangement of optical elements in the relay optical system 25 may be changed while considering the distance yO between the first and second image projectors 10a and 10b, and a distance t5 between the relay optical system 25 and the viewer, so that the lights projected from the first and second image projectors 10a and 10b are both incident on the pupil 31. For example, the lights projected from the first and second image projectors 10a and 10b may be incident within the size yl of the pupil 31 distanced from the second lens 24 by a distance t5 by adjusting a distance t1 between the active optical element 21 and the first lens 22, a distance t2 between the first lens 22 and the barrier 23, a distance t3 between the barrier 23 and the second lens 24, and/or a distance t4 between the first lens 22 and the second lens 24.

As another example, a plurality of images in different views may be provided to the pupil 31 in a time division method, by adjusting an angle of the lights refracted by the active optical element 21. Accordingly, a variable prism device, for example, an electro-wetting prism, may be used as the active optical element 21. Although not illustrated in FIG. 1, the electro-wetting prism may include, for example, a bath, a polar liquid and/or non-polar liquid filled within the bath, and an electrode surrounding another surface of the bath. For example, an interface between the polar liquid and the non-polar liquid filled within the bath may operate as a refractive surface capable of tilting. For example, by applying a voltage to the electrode surrounding the outer surface of the bath, a slope of the refractive surface may vary according to an electric control. As another example, the active optical element 21 may be generated by a mechanical-electric method, instead of using the electro-wetting.

Figure 2A:
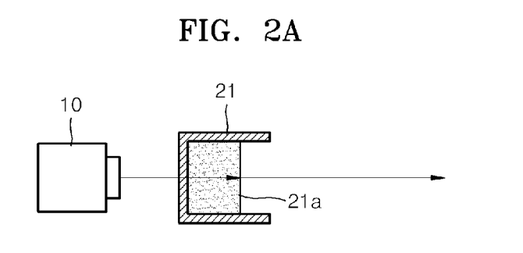
FIGS. 2A through 2C are diagrams illustrating examples of operations of an active optical element that may be used in the apparatus of FIG. 1.
Figure 2B:
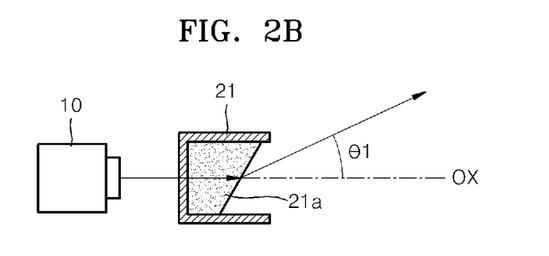
Figure 2C:
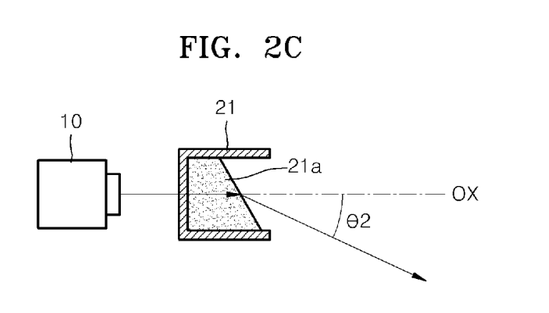

FIGS. 2A through 2C illustrate examples of operations of the active optical element 21 that may be used in the apparatus 100 of FIG. 1.

Referring to FIG. 2A, if a refractive surface 21a of the active optical element 21 is not tilted, a light projected from an image projector 10 may pass through the active optical element 21 without a change of path. As shown in FIG. 2B, if the refractive surface 21a is tilted downward, for example, by electrically controlling the active optical element 21, the light projected from the image projector 10 may pass through the active optical element 21 after being refracted by an angle of $+\theta 1$ with respect to the optical axis OX by the refractive surface 21a. Alternatively, if the refractive surface 21a is tilted upward, for example by electrically controlling the active optical element 21, the light projected from the image projector 10 may pass through the active optical element 21 after being refracted by an angle of $-\theta 2$ with respect to the optical axis OX by the refractive surface 21a. When the light projected from the image projector 10 is refracted by the active optical element 21, an incident angle of light that is incident on the pupil 31 of the viewer through the relay optical system 25 also changes, and thus, the viewer may see images in different views.

It should also be understood that similar tilting of the active optical element 21 may change the path of light left or right. That is, the active optical element 21 may be used to change the path of light upwards, downwards, left, right, or a combination thereof.

Figure 3:
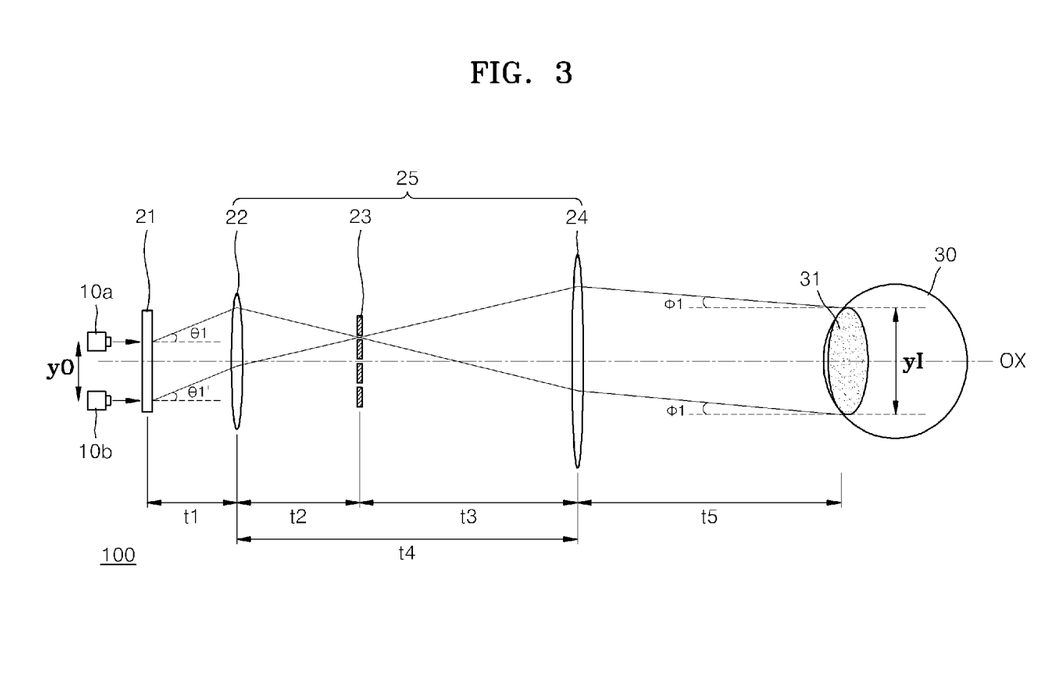
FIGS. 3 through 5 are diagrams illustrating example operations of the apparatus of FIG. 1.
Figure 4:
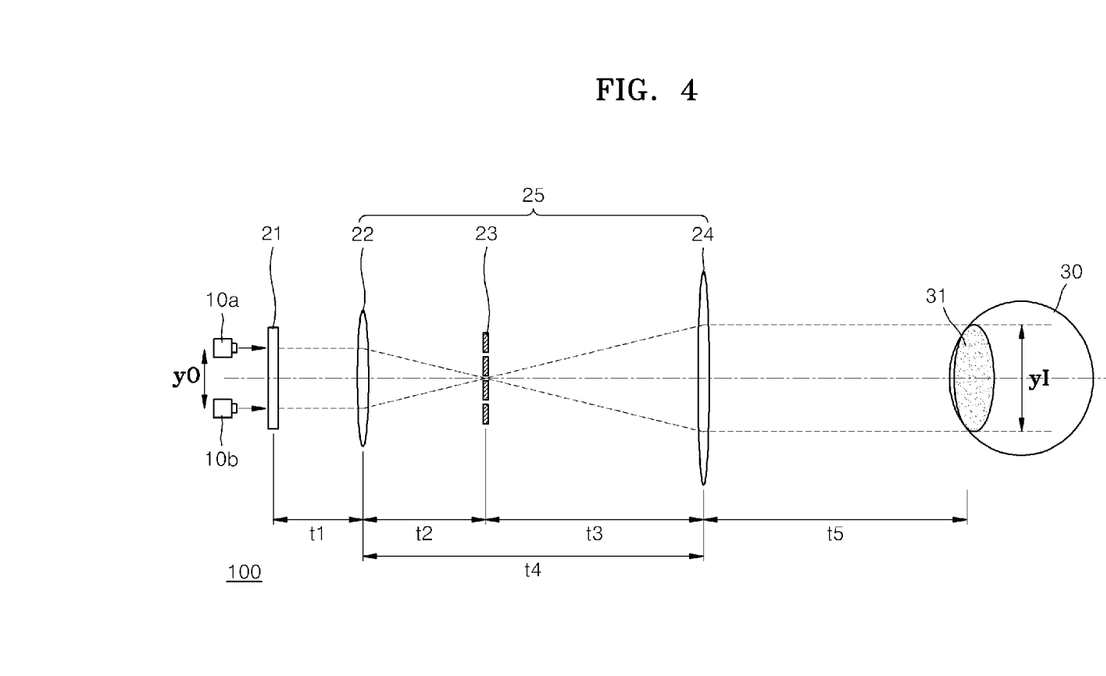
Figure 5:
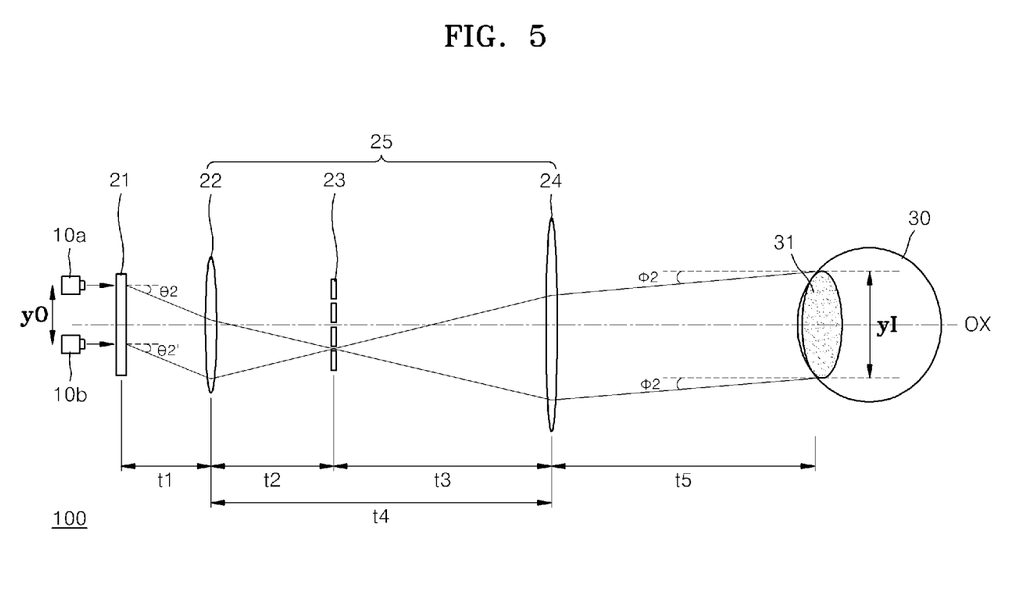

FIGS. 3 through 5 illustrate example of operations of the apparatus 100 of FIG. 1.

Referring to FIG. 3, the first image projector 10a projects light including an image of a first view, and the second image projector 10b projects light including an image of a second view that is different from the first view, for a time T1. In this example, the active optical element 21 synchronizes with a light projecting time of the first and second image projectors 10a and 10b. For example, the active optical element 21 may tilt the refractive surface downward so that the light refracts upward. FIG. 3 illustrates only one active optical element 21, but one active optical element 21 may be disposed for each of the first and second image projectors 10a and 10b. For example, the apparatus 110 may include a plurality of optical elements 21 such that each image projector 10a and 10b may have a respective optical element 21.

For example, tilting angles of refractive surfaces of the active optical elements 21 may not be the same. For example, the light projected from the first image projector 10a may be refracted by an angle of $+\theta 1$ with respect to the optical axis OX, and the light projected from the second image projector 10b may be refracted by an angle of $+\theta 1'$ with respect to the optical axis OX. Accordingly, the lights may be simultaneously incident on the pupil 31 at different angles from different locations by the relay optical system 25. For example, the light projected from the first image projector 10a may be incident on the left edge of the pupil 31 at an angle of $\phi 1$ across the optical axis OX. As another example, the light projected from the second image projector 10b may be incident on the right edge of the pupil 31 at an angle of $\phi 1'$ across the optical axis OX. As another example, $\theta 1$ may be equal to $\theta 1'$ and $\phi 1$ may be equal to $\phi 1'$. As another example, $\theta 1$ may not be equal to $\theta 1'$ and $\phi 1$ may not be equal to $\phi 1'$.

Referring to FIG. 4, the first image projector 10a projects light including an image of a third view that is different from the first and second views, and the second image projector 10b projects light including an image of a fourth view that is different from the first through third views, for a time T2. In this example, the active optical element 21 synchronizes with light projecting times of the first and second image projectors 10a and 10b so as to be perpendicular to the optical axis OX without tilting the refractive surface. The lights projected from the first and second image projectors 10a and 10b may proceed parallel to the optical axis OX without refracting by the active optical element 21. Accordingly, the lights may be simultaneously incident on different locations of the pupil 31 through the relay optical system 25. For example, the light projected from the first image projector 10a may be incident on the left edge of the pupil 31 in parallel to the optical axis OX after crossing over the optical axis OX. Also, the light projected from the second image projector 10b may be incident on the right edge of the pupil 31 in parallel to the optical axis OX after crossing over the optical axis OX.

Referring to FIG. 5, the first image projector 10a projects light including a fifth view that is different from the first through fourth views, and the second image projector 10b projects light including a sixth view that is different from the first through fifth views, for a time T3. In this example, the active optical element 21 synchronizes with light projecting times of the first and second image projectors 10a and 10b, for example, to control the lights to refract downward by tilting the refractive surface upward. For example, one active optical element 21 may be disposed for each of the first and second image projectors 10a and 10b, and the tilting angles of the refractive surfaces of the active optical elements 21 may not be the same. For example, the light projected from the first image projector 10a may be refracted by an angle of $-\theta 2$ with respect to the optical axis OX, and the light projected from the second image projector 10b may be refracted by an angle of $-\theta 2'$ with respect to the optical axis OX. The lights may be incident on the pupil 31 at different angles from different locations by the relay optical system 25. For example, the light projected from the first image projector 10a may be incident on the left edge of the pupil 31 across the optical axis OX at an angle of $\phi 2$. Also, the light projected from the second image projector 10b may be incident on the right edge of the pupil 31 across the optical axis OX at an angle of $-\phi 2'$. As an example, $\theta 2$ may be equal to $\theta 2'$ and $\phi 2$ may be equal to $\phi 2'$. As another example, $\theta 2$ may not be equal to $\theta 2'$ and $\phi 2$ may not be equal to $\phi 2'$. Also, $\theta 1$ may be equal to $\theta 2$ and $\phi 1$ may be equal to $\phi 2$.

Figure 6:
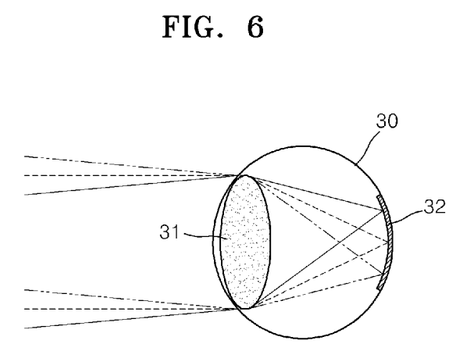
FIG. 6 is a diagram illustrating an example of views formed on a retina of a viewer's eyeball.

FIG. 6 illustrates an example of views formed on a retina of a viewer's eyeball.

Referring to FIG. 6, the images of the first through sixth views are each formed on the retina 32 of the viewer through the pupil 31 of the eyeball 30. In this example, the images of the first through sixth views are an image of the same frame having different views. According to a time division method, the images of the first and second views are first simultaneously formed on the retina 32 for a duration T1, the images of the third and fourth views are then simultaneously formed on the retina 32 for a duration T2, and the images of the fifth and sixth views are lastly simultaneously formed on the retina 32 for a duration T3. For example, the times T1 through T3 may be adjusted so that the viewer feels as if the images of the first through sixth views are almost simultaneously formed on the retina 32. For example, when a frame rate for displaying an image of one frame is about 30 Hz, the times T1 through T3 may be adjusted to be approximately 0.011 seconds. Accordingly, the viewer may view the images of the first through sixth views without feeling a time difference of displaying the images of the first through sixth views.

As described above, a plurality of images in different views may be provided to the viewer in the time division method. In the above example of FIG. 6, images of six views are provided, but the number of views is not limited thereto. For example, the tilting angle of the refractive surface 21a of the active optical element 21 may be subdivided to provide more than six views or less than six views. In this example, the first and second image projectors 10a and 10b are used, but only one image projector may be used to provide the images in different views using the time division method. Alternatively, three or more image projectors may be used to provide the images in different views using the time division method.

As described above, image information of different views may be provided in the time division method with one image projector by using the active optical element 21 that is capable of adjusting a path of light by refracting the light. Accordingly, the number of image projectors necessary to provide the image information of different views is reduced, thereby reducing a size and volume of the entire system. Also, because the image information in different views is provided in the time division method, resolution does not decrease and a multi-view or a super multi-view is maintained. Furthermore, because the apparatus 100 provides images of at least two views to a pupil of a viewer, the viewer may not experience a crosstalk effect and the views may be of a natural 3D image. In addition, the viewer feels a 3D effect with at least one eye.

Figure 7:
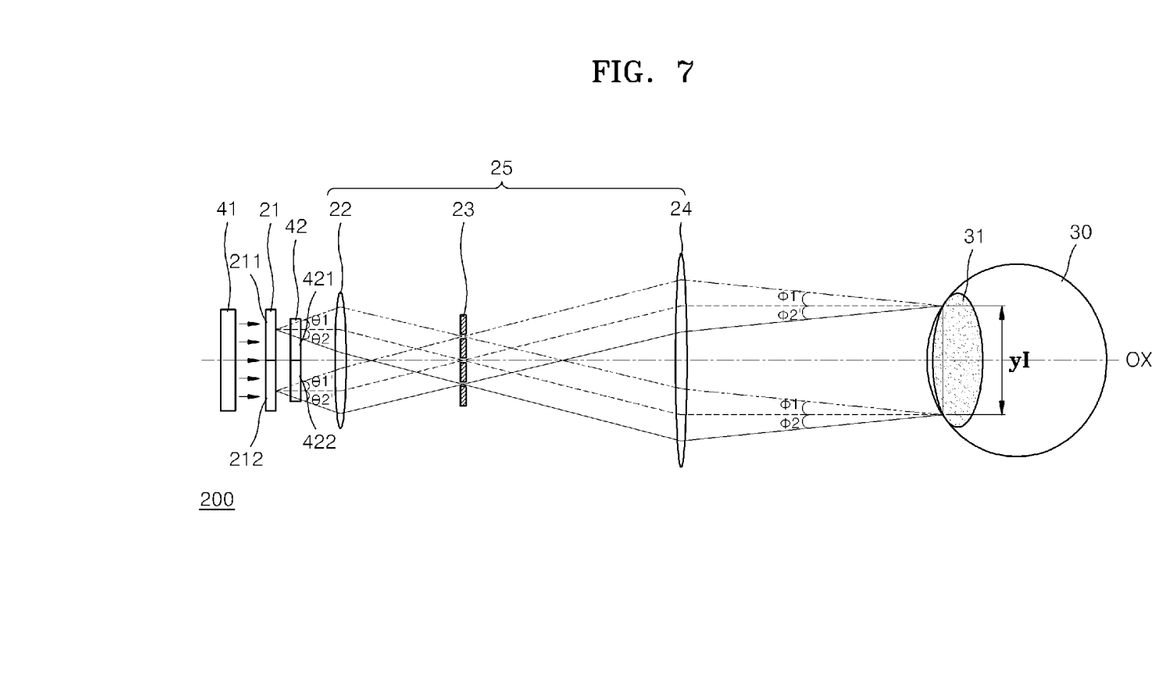
FIG. 7 is a diagram illustrating another example of an apparatus for displaying a super multi-view 3D image.

The apparatus 100 using an image projector has been described above, but operations of the present invention may also be applied to a general flat display panel. For example, the 3D image may be a still image, a motion picture image, and the like FIG. 7 illustrates another example of an apparatus for displaying a super multi-view 3D image. The apparatus 200 may use a flat display panel 42 of a non-emissive type, for example, a liquid crystal display panel.

Referring to FIG. 7, the apparatus 200 includes a backlight unit 41 providing light, a display panel 42, an active optical element 21 disposed between the backlight unit 41 and the display panel 42, and a relay optical system 25 disposed in front of the display panel 42. As described above, the relay optical system 25 may include the first lens 22 for focusing a light refracted by the active optical element 21, the barrier 23 including the plurality of pin holes 23a, and the second lens 24 for transmitting an image to the pupil 31 of the viewer. In this example, the display panel 42 includes a plurality of pixels arranged in a 2D array. However, in FIG. 7, only two pixels, namely, first and second pixels 421 and 422 are shown for convenience. Also, only two active optical elements 21 are shown in FIG. 7 for convenience, but a plurality of the active optical elements 21 may be arranged in an array so as to correspond to the pixels of the non-emissive display panel 42 in a one-to-one correspondence. As another example, one active optical element 21 may correspond to one column or row of pixels of the display panel 42. The backlight unit 41 may be configured to provide a collimated parallel light so as to increase a depth of a 3D image. Accordingly, although not illustrated in FIG. 7, the backlight unit 41 may include a collimating unit, such as a small lens array.

In this example, the parallel light provided from the backlight unit 41 may be refracted in a predetermined angle by the active optical element 21. As described above, the active optical element 21 may be controlled to refract the light at different angles in a chronological order within a predetermined angle range. For example, a first active optical element 211 corresponding to the first pixel 421 may sequentially refract the light at an angle range from θ1 to −θ2, and a second active optical element 212 corresponding to the second pixel 422 may sequentially refract the light at an angle range from θ1' to −θ2'. Generally, θ1, θ2, θ1', and θ2' may be approximately equal, but may be different according to views of images displayed by the first and second pixels 421 and 422.

The light refracted by the active optical element 21 may be turned into light including image information by passing through the first and second pixels 421 and 422. For example, the light that passes through the first pixel 421 may include image information of a first view, and the light that passes through the second pixel 422 may include image information of a second view that is different from the first view. In other words, the light passing through at least two adjacent first and second pixels 421 and 422 may include the image information in different views. Each light ray may be directed incident on the pupil 31 of the viewer by the relay optical system 25. For example, the light may be focused by the first lens 22, and incident on the second lens 24 across the optical axis OX. At this time, a noise component in the light may be removed by the pin holes 23a. The light may be refracted toward the pupil 31 by the second lens 24. In this example, the light including the image information of the first view is incident on the left edge of the pupil 31 through the first pixel 421, and the light including the image information of the second view is incident on the right edge of the pupil 31 through the second pixel 422.

As described above, angles of the light refracted by the active optical element 21 may differ according to a chronological order, and the first and second pixels 421 and 422 may display images in different views. Accordingly, the apparatus 200 of FIG. 7 may provide the images in different views to the pupil 31 of the viewer according to the time division method.

Figure 8:
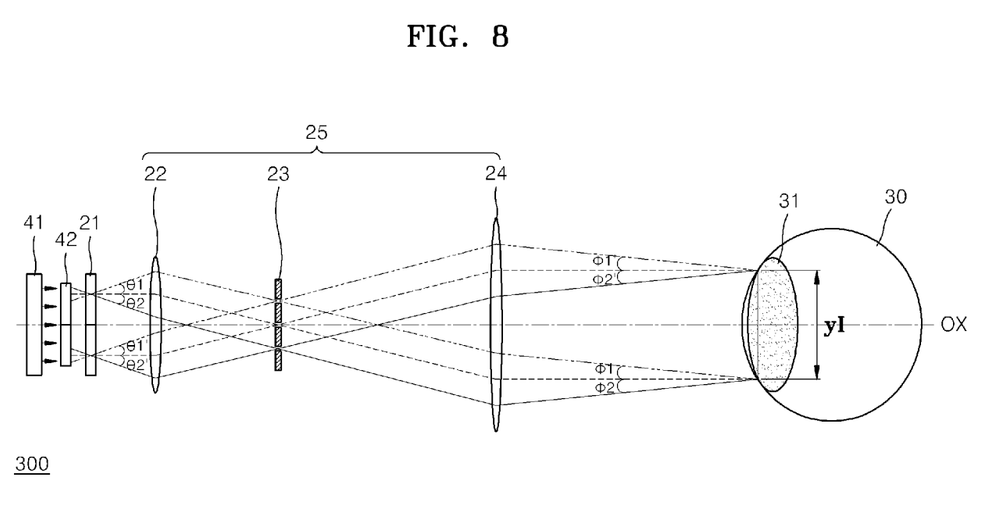
FIG. 8 is a diagram illustrating another example of an apparatus for displaying a super multi-view 3D image.

FIG. 8 illustrates another example of an apparatus for displaying a super multi-view 3D image. In comparison to the apparatus 200 of FIG. 7, the active optical element 21 of apparatus 300 of FIG. 8 is disposed in front of the display panel 42 instead of between the backlight unit 41 and the display panel 42. In other words, in the apparatus 300 of FIG. 8, the backlight unit 41, the display panel 42, and the active optical element 21 are disposed in the stated order along a proceeding path of light. Other structures and operations of the apparatus 300 are the same as those of the apparatus 200. As such, when the active optical element 21 is disposed in front of the display panel 42, the display panel 42 may not only be a non-emissive display panel, but also an emissive display panel. For example, the apparatus 300 may include the active optical element 21 and the relay optical system 25 disposed in front of a display panel, such as a plasma display panel (PDP), a cathode-ray tube (CRT), an organic light emitting diode (OLED), a field emission display (FED), and the like. At this time, the backlight unit 41 may not be used.

Meanwhile, referring to FIGS. 7 and 8, the first and second lenses 22 and 24 of the relay optical system 25 may each use a single lens device, but may each be a lens array sheet wherein a plurality of lens devices are arranged.

Figure 9:
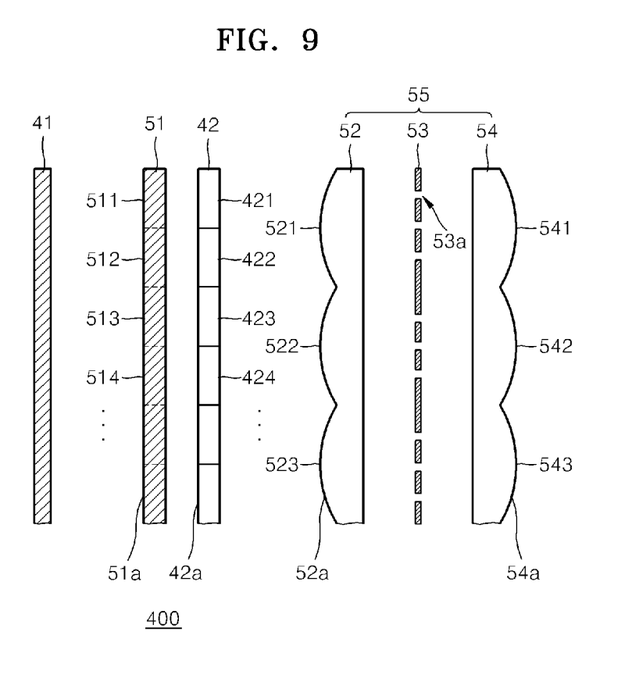
FIG. 9 is a diagram illustrating another example of an apparatus for displaying a super multi-view 3D image.

FIG. 9 illustrates another example of an apparatus for displaying a super multi-view 3D image.

Referring to FIG. 9, apparatus 400 includes a backlight unit 41 for providing light, a display panel 42, an active optical element array 51 disposed between the backlight unit 41 and the display panel 42, and a relay optical system 55 disposed in front of the display panel 42. For example, the relay optical system 55 may include a first lens array sheet 52 for focusing light refracted by the active optical element array 51, a barrier 53 including a plurality of pin holes 53a, and a second lens array sheet 54 for providing an image to a pupil of a viewer. In FIG. 9, the active optical element array 51 is disposed between the backlight unit 41 and the display panel 42. As another example, the locations of the display panel 42 and the active optical element array 51 may be switched. Also, the display panel 42 may be used as an emissive display panel so as not to use the backlight unit 41.

Also, as shown in FIG. 9, the display panel 42 includes a plurality of pixels 421, 422, 423, 424, and so on, which are arranged in a 2D array. Also, the active optical element array 51 may include a plurality of active optical elements 511, 512, 513, 514, and so on, which correspond to the pixels 421, 422, 423, 424, and so on in a one-to-one relationship. Alternatively, one active optical element may correspond to a column or row of pixels of the display panel 42.

Figure 10A:
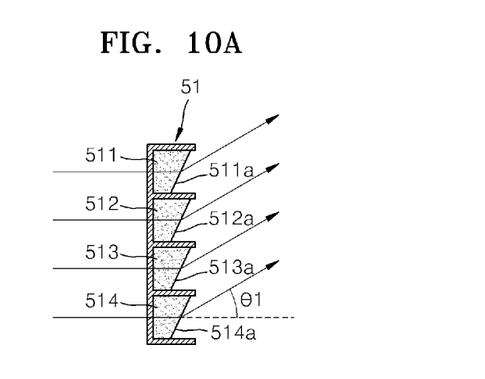
FIGS. 10A through 10C are diagrams illustrating examples of operations of an active optical element array that may be used in the apparatuses of FIGS. 7 and 8.
Figure 10B:
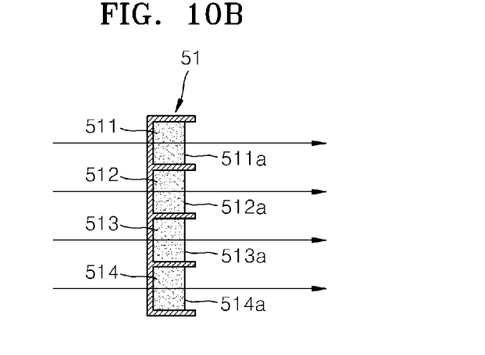
Figure 10C:
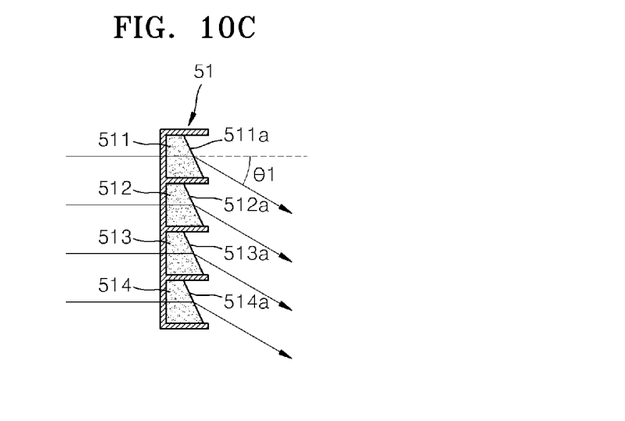

FIGS. 10A through 10C illustrate examples of operations of the active optical element array 51 that may be used in the apparatuses 200 and 300 of FIGS. 7 and 8.

Referring to FIGS. 10A through 10C, active optical elements 511, 512, 513, 514, and so on of the active optical element array 51 may respectively include, for example, refractive surfaces 511a, 512a, 513a, 514a, and so on, which may be tilted in different angles, according to an electric control. As shown in FIG. 10A, when the refractive surfaces 511a, 512a, 513a, 514a are tilted downward, light may refract at an angle of +θ1 with respect to the optical axis OX and then pass through the active optical element array 51. As shown in FIG. 10B, when the refractive surfaces 511a, 512a, 513a, 514a are not tilted, the light may pass through the active optical element array 51 without a change of a path. Also, as shown in FIG. 10C, when the refractive surfaces 511a, 512a, 513a, 514a are tilted upward, the light refracts in an angle of −θ1 with respect to the optical axis OX and then pass through the active optical element array 51. For example, the light refracting operation of the active optical element array 51 may be controlled to synchronize with a time when the pixels 421, 422, 423, 424, and so on of the display panel 42 display an image of a certain view.

It should also be understood that similar tilting of the active optical element 51 may change the path of light left or right. That is, the active optical element 51 may be used to change the path of light upwards, downwards, left, right, or a combination thereof.

Referring again to FIG. 9, the first lens array sheet 52 may include minute unit lenses 521, 522, 523, and so on, and the second lens array sheet 54 may include minute unit lenses 541, 542, 543, and so on. The minute unit lenses 521, 522, 523, and so on, and 541, 542, 543, and so on may be, for example, plano-convex cylinder lenses corresponding to two pixel arrays of the display panel 42. For example, as shown in FIG. 9, convex surfaces of the minute unit lenses 521, 522, 523, and so on of the first lens array sheet 52 may be disposed facing the display panel 42, and convex surfaces of the minute unit lenses 541, 542, 543, and so on of the second lens array sheet 54 may be disposed facing a viewer. The width of each of the minute unit lenses 521, 522, 523, and so on, and 541, 542, 543, and so on may correspond to two pixel arrays of the display panel 42, but the number of corresponding pixel arrays is not limited thereto. For example, the width may correspond to one pixel array, or at least three pixel arrays.

When the width corresponds to two pixel arrays, the first and third pixels 421 and 423 may display an image of a first view, and the second and fourth pixels 422 and 424 may display an image of a second view that is different from the first view, for a time T1. At this time, for example, the active optical element array 51 may refract the light upward. Also, the first and third pixels 421 and 423 may display an image of a third view that is different from the first and second views, and the second and fourth pixels 422 and 424 may display an image of a fourth view that is different from the first through third views, for a time T2. At this time, the active optical element array 51 may not refract the light and control the light to proceed parallel to the optical axis OX. Also, the first and third pixel 421 and 423 may display an image of a fifth view that is different from the first through fourth views, and the second and fourth pixels 422 and 424 may display an image of a sixth view that is different from the first through fifth views, for a time T3. At this time, for example, the active optical element array 51 may refract the light downward.

When the width corresponds to three pixel arrays, for example, the first through third pixels 421, 422, and 423 may display images in different first through third views, and the fourth pixel 424 may display the image of the first view. As described above, the images in different views may be displayed in the time division method by using the active optical element array 51.

Recently, apparatuses for displaying a super multi-view 3D image are being suggested, wherein a 3D image is viewed with one eye while providing natural motion parallax. Such apparatuses provide a plurality of images in different views to one eye of a viewer. Accordingly, the apparatuses for displaying a super multi-view 3D image form the images in different of views in an area smaller than a pupil of the single eye of the viewer. Thus, the images in different views are always projected onto the pupils of the viewer, and thus the viewer feels a 3D effect with the single eye. Accordingly, a natural 3D effect is possible.

The processes, functions, methods, and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A three-dimensional (3D) image display apparatus, comprising:
an active optical element configured to be switched to have different configurations to adjust the path of light beams defining different perspectives of a single image by refracting the light beams in a time sequential manner; and
a relay optical system configured to transmit the refracted light beams towards a pupil of a viewer, wherein
first and second perspectives of the image are simultaneously transmitted to the pupil at a first angle, in accordance with the active optical element being in a first configuration, third and fourth perspectives of the same image are simultaneously transmitted to the pupil at a second angle, in accordance with the active optical element being in a second configuration, wherein the first, second, third and fourth perspectives of the image are observed together by the pupil to give a 3D appearance.

2. The apparatus of claim 1, wherein the active optical element is capable of refracting light beams at different angles.

3. The apparatus of claim 2, wherein the active optical element is an electro-wetting prism having a slope of a refractive surface that changes according to an electrical control.

4. The apparatus of claim 1, further comprising:
an image projector configured to sequentially project the different perspectives of the image according to a chronological order, wherein
the active optical element is configured to refract light comprising the different perspectives of the image at different angles by synchronizing with a light projecting time of the image projector.

5. The apparatus of claim 1, wherein the relay optical system comprises:
a first lens configured to focus the light refracted by the active optical element;
a barrier comprising a plurality of pin holes; and
a second lens configured to transmit the light to the pupil of the viewer, wherein
the light focused by the first lens is conveyed through the pin holes to the second lens.

6. The apparatus of claim 5, wherein the distance between the active optical element and the first lens, the distance between the first lens and the barrier, the distance between the barrier and the second lens, and the distance between the first lens and the second lens is adjusted such that all of the projected light is incident within the pupil.

7. The 3D image display apparatus of claim 1, wherein the relay optical system transmits the different perspectives of the image towards different respective edges of the pupil of the viewer such that the perspectives are simultaneously incident within the pupil of the viewer.

8. An apparatus for displaying a three-dimensional (3D) image, the apparatus comprising:
a display panel comprising an array of pixels and configured to generate light defining different perspectives of a single image in a time sequential manner;
an active optical element configured to be switched to have different configurations to adjust a path of light incident from the display panel by refracting the light; and
a relay optical system configured to transmit the light refracted by the active optical element to a pupil of a viewer, wherein
first and second perspectives of the image are simultaneously transmitted to the pupil at a first angle, in accordance with the active optical element being in a first configuration, third and fourth perspectives of the same image are simultaneously transmitted to the pupil at a second angle, in accordance with the active optical element being in a second configuration, such that the first, second, third and fourth perspectives of the image are observed together by the pupil to give a 3D appearance.

9. The apparatus of claim 8, further comprising:
a backlight unit configured to provide parallel light to the display panel, wherein
the display panel is a non-emissive display panel.

10. The apparatus of claim 8, wherein the active optical element is capable of refracting light at a plurality of different angles.

11. The apparatus of claim 10, wherein the active optical element is an electro-wetting prism having a slope of a refractive surface that changes according to an electrical control.

12. The apparatus of claim 8, wherein a plurality of active optical elements are disposed in an array in a one to one correspondence with the plurality of pixels of the display panel or in correspondence with pixels in one column of the display panel.

13. The apparatus of claim 8, wherein the display panel is configured such that at least two adjacent pixels display an image having different perspectives.

14. The apparatus of claim 8, wherein:
the display panel is configured to sequentially display the different perspectives of the image according to a chronological order, and
the active optical element is configured to refract light comprising the different perspectives of the image at different angles by synchronizing with a time of the display panel displaying an image of a certain view.

15. The apparatus of claim 8, wherein the relay optical system comprises:
a first lens configured to focus the light refracted by the active optical element;
a barrier comprising a plurality of pin holes; and
a second lens configured to transmit the refracted light to the pupil of the viewer, wherein
the light focused by the first lens is conveyed through the pin holes to the second lens.

16. The apparatus of claim 15, wherein the first and second lenses are each formed of a lens array sheet having an array of minute unit lenses.

17. The apparatus of claim 16, wherein each of the minute unit lenses is a plano-convex cylinder lens.

18. The apparatus of claim 17, wherein:
a convex surface of each of the minute unit lenses of the first lens is disposed facing the display panel, and
a convex surface of each of the minute unit lenses of the second lens is disposed facing the viewer.

19. The apparatus of claim 16, wherein a width of each of the minute unit lenses is configured to correspond to a width of at least one pixel array.

20. An apparatus for displaying a three-dimensional (3D) image, the apparatus comprising:
a display panel comprising an array of pixels;
a backlight unit disposed at a rear surface of the display panel, and configured to provide light defining different perspectives of a same image to the display panel in a time sequential manner;

an active optical element disposed between the backlight unit and the display panel, and configured to be switched to have different configurations to change the path of the light incident from the backlight unit by refracting the light; and
a relay optical system disposed at a front surface of the display panel and configured to transmit the light passed through the display panel to a pupil of a viewer, wherein
first and second perspectives of the image are simultaneously transmitted to the pupil at a first angle, in accordance with the active optical element being in a first configuration, third and fourth perspectives of the same image are simultaneously transmitted to the pupil at a second angle, in accordance with the active optical element being in a second configuration, such that the first, second, third and fourth perspectives of the image are observed together by the pupil to give a 3D appearance.

* * * * *